United States Patent
Buehler et al.

(10) Patent No.: US 7,154,430 B1
(45) Date of Patent: Dec. 26, 2006

(54) VENTRILOQUAL JAMMING USING A TOWED TRANSMISSION LINE

(75) Inventors: Walter E. Buehler, Issaquah, WA (US); Michael J. Lewis, Seattle, WA (US); David Lunden, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 06/225,698

(22) Filed: Jan. 16, 1981

(51) Int. Cl.
  *G01S 7/38* (2006.01)
(52) U.S. Cl. ............................................ 342/13; 342/14
(58) Field of Classification Search ............... 244/3.12; 343/18 E, 707, 785, 87.7; 342/13–15, 9
See application file for complete search history.

(56) References Cited

U.S. PATENT DOCUMENTS

| | | | |
|---|---|---|---|
| 2,168,860 A | | 8/1939 | Berndt |
| 2,187,575 A | | 1/1940 | Schroder |
| 2,251,418 A | | 8/1941 | Pavlik |
| 2,272,213 A | | 2/1942 | Lear |
| 2,406,945 A | * | 9/1946 | Fell |
| 2,502,650 A | | 4/1950 | Harris et al. |
| 2,634,924 A | * | 4/1953 | Brown ........................ 244/3 |
| 2,685,068 A | | 7/1954 | Goubau |
| 2,723,378 A | | 11/1955 | Clavier et al. |
| 2,770,783 A | | 11/1956 | Clavier et al. |
| 2,852,753 A | | 9/1958 | Gent et al. |
| 2,867,776 A | * | 1/1959 | Wilkinson, Jr. |
| 2,879,999 A | * | 3/1959 | Marshall ..................... 273/360 |
| 2,913,722 A | | 10/1959 | Brueckmann |
| 2,921,277 A | | 1/1960 | Goubau |
| 2,986,733 A | * | 5/1961 | Trilling ....................... 343/707 |
| 3,086,202 A | * | 4/1963 | Hopper et al. ............. 343/18 E |
| 3,134,951 A | | 5/1964 | Huber et al. |
| 3,241,145 A | * | 3/1966 | Petrides ...................... 343/705 |
| 3,251,565 A | | 5/1966 | Haist |

(Continued)

FOREIGN PATENT DOCUMENTS

GB              761659          4/1953

*Primary Examiner*—John B. Sotomayor
(74) *Attorney, Agent, or Firm*—John C. Hammar (57) ABSTRACT

A radar jamming signal generated by equipment carried by a target aircraft, is launched onto the leading end of a towed single wire transmission line so as to travel the length of the line as a nonradiating surface wave. A drogue radiator is attached to the trailing end of the line for radiating the jamming signal transversely of the towed line so as to be received by and cause jamming of tracking and/or fire control radar. The length of the single wire transmission line is selected so that the trailing radiator causes the jamming signal to emanate from a position sufficiently behind the aircraft so as to be outside the destructive radius of weapon fire directed at the apparent source of the jamming signal by fire control radar. A ventriloqual-like deception of the radar is thus achieved. A wave launcher couples the jamming signal to the leading end of the transmission line and for this purpose includes an electrically conducted horn-shaped structure, a tunable coaxial feed end at the constricted end of the horn structure, an inner transition conductor connecting the inner conductor of the coaxial feed to a leading end of the single wire transmission line, and a plurality of annular dielectric lenses and dielectric guides cooperatively shaped and fitted to the horn structure in a manner that effectively matches the bounded electromagnetic transmission wave characteristics of the coaxial feed cable with the surface wave transmission characteristics of the single wire transmission line.

21 Claims, 4 Drawing Sheets

U.S. PATENT DOCUMENTS

| | | | |
|---|---|---|---|
| 3,268,898 A * | 8/1966 | Colony | 343/877 X |
| 3,496,567 A * | 2/1970 | Held | 343/707 |
| 3,499,171 A | 3/1970 | Carrel et al. | |
| 3,518,691 A | 6/1970 | Hallendorff | |
| 3,560,982 A | 2/1971 | Fenwick | |
| 3,566,317 A * | 2/1971 | Hafner | 343/877 X |
| 3,568,191 A * | 3/1971 | Hiester et al. | 342/8 |
| 3,588,754 A * | 6/1971 | Hafner | 343/785 X |
| 3,806,944 A | 4/1974 | Bickel | |
| 3,823,402 A | 7/1974 | Tharp | |
| 3,829,861 A * | 8/1974 | Karaganis et al. | 343/707 |
| 3,845,426 A | 10/1974 | Barlow | |
| 4,032,845 A | 6/1977 | Via | |
| 4,149,166 A * | 4/1979 | Null | 343/18 E |
| 4,197,546 A * | 4/1980 | Cachier et al. | 343/785 X |
| 4,278,955 A * | 7/1981 | Lunden | 333/33 |
| 4,354,419 A * | 10/1982 | Patterson | 89/1.11 |

\* cited by examiner

Fig. 1.

VENTRILOQUAL JAMMING USING A TOWED TRANSMISSION LINE

BACKGROUND OF THE INVENTION

The invention pertains to signal jamming systems, carried by manned or unmanned aircraft including missiles, for the avoidance of position locating, tracking and fire control radar.

The present application is related to the subject matter of U.S. application Ser. No. 225,669, filed Jan. 16, 1981, by Walter E. Buehler, Roger M. Whitson and Michael J. Lewis, for ANTI SIGNAL-INTEGRATION APPARATUS AND METHOD FOR COUNTERING INTEGRATION ENHANCEMENT OF RADAR RETURN SIGNALS MASKED BY AIRBORNE VENTRILOQUAL-LIKE NOISE JAMMING.

The use of radar signal jamming equipment carried onboard manned and unmanned aircraft to mask the aircraft's position from position locating, tracking and fire (weaponry) control radar is one of a number of known radar avoidance techniques that fall in the broader field of electronic counter measures (ECMs). Existing jamming techniques are primarily effective in denying the radar equipment range information, i.e., the distance between the radar and the target aircraft. However, the transmission of the jamming signal, emanating as it does from the aircraft, enables some radar systems to home-in on the source of the jamming signal, which is typically a noise signal in the frequency band of the radar, and thereby acquire accurate information representing the angular position of the aircraft. This angle information alone, even without range determination, is sufficient to allow for many types of weaponry, aimed by fire control radar, to reach and destroy the target aircraft. Thus, the mere generation and transmission of a noise jamming signal is not totally effective and providing the desired masking of the aircraft to the tracking radar.

Accordingly, an object of the invention is to provide a system for generating and radiating a radar jamming signal from a target aircraft that is to be masked from the radar in such a manner that the jamming signal deceptively emanates from a position which is removed at a safe distance from the target aircraft.

More particularly, it is an object of the invention to provide an apparatus for transmitting an onboard generated jamming signal over a transmission line towed by the target aircraft, and radiating the jamming signal from a passive radiator attached to a trailing end of the transmission line. A related object is to provide such a towed transmission line for the jamming signal which is capable of transmitting the jamming signal efficiently over the relatively long distance needed to dispose the point of signal radiation at a safe distance from the target aircraft, and to employ a line having transmission characteristics that preclude excessive radiation leakage at the leading end and along intermediate sections of the line which, if allowed to occur, would cause the emission of a radar trackable signal source at positions dangerously close to the target aircraft.

Still another object is to provide a transmission line for the above-mentioned ventriloqual-like radar jamming system, that has high efficiency so as to enable sufficient signal power to reach the radiator at the trailing end of the line so that a jamming signal of adequate strength can be radiated to effectively mask the target aircraft.

In accordance with the foregoing objects, it is a feature of the invention to employ a single wire transmission line, which characteristically provides highly efficient signal transmission when in free space or air and to tow such line behind the target aircraft. In connection with this feature, it is another object to provide a broadband, highly efficient, nonleaking electromagnetic wave launcher for launching the onboard generated jamming signals onto the leading end of the towed single wire transmission line.

It is also a feature to provide a single wire transmission line that is constructed to accommodate efficient surface wave transmission and that is also sufficiently flexible to allow it to be wound onto and unwound from a line stowage reel carried onboard the target aircraft.

A further feature is to provide a radiator in the form of a drogue for attachment to the trailing end of the line for radiating and selectively polarizing the thusly radiated jamming signal, and for causing stable trailing flight of the line consistent with efficient transmission of the jamming signal wave energy along the line.

SUMMARY OF THE INVENTION

These and other objects, features and advantages are achieved in accordance with the invention by an airborne radar jamming method and apparatus characterized by the provision of a single wire transmission line towed behind a target aircraft, which as the term is used herein includes manned or unmanned aircraft, missiles, rockets, and the like, for causing the jamming signal to be radiated at a "safe" distance behind the aircraft. Briefly, the principal elements of the jamming system include an onboard signal generator for producing a broadband noise (jamming) signal, the above-mentioned single wire transmission line towed by the aircraft, a broadband electromagnetic wave launcher for launching the noise signal produced by the signal generator onto a leading end of the single wire transmission line such that the electromagnetic noise energy is transmitted as a surface wave along the line to a trailing end thereof. A drogue radiator is attached to the trailing end of the single wire transmission line for both aerodynamically stabilizing the line and for radiating the noise signal away from the axis of the line and toward the tracking radar. By using a sufficiently long transmission line relative to the beamwidth of the tracking radar, the latter is deceived by the ventriloqual-like radiation of the noise jamming signal from an apparent source that is at a substantial distance behind the would be target. Thus, the jamming signal masks the radar return signal reflected off the skin of the target aircraft, and if the radar is of a type that upon losing tracking contact with the aircraft skin searches out and homes-in on the angular position of a nearby noise signal source, the ventriloqual-like effect of the trailing radiator denies the tracking radar accurate angle location information of the target's position.

Another aspect of the invention is the provision of a broadband electromagnetic wave launcher that is disposed and connected to couple a broadband noise (jamming) signal onto the leading end of the towed single wire transmission line. The launcher is characterized by a coaxial feed line that extends from the onboard generator to the constricted end of a horn structure where an adjustably slidable impedance matching assembly efficiently couples the electromagnetic energy of the noise signal into the horn structure. The inner conductor of the feed cable is connected to a transition conductor coaxially centered in the horn structure and such transition conductor blends into the single wire transmission line which emerges from the flared end of the horn. Annular dielectric guide and electromagnetic lens structures are coaxially mated to the horn and are fixedly supported thereby for the multipurposes of centering the transition conductor and the leading end of the single wire transmission line and for efficiently compressing the bundle of electromagnetic energy that comprises the signal so that as it emerges from its bounded condition between the flared end of the horn and the transition conductor the signal energy adheres to the line as a surface wave. Such compression of the emerging energy bundle smoothly and gradually reshapes the signal energy so that it matches the impedance and surface wave transmission characteristics of the single wire transmission line without significant energy leakage at the launcher.

To provide a complete disclosure of the invention, reference is made to the appended drawings and following description of one particular and preferred embodiment.

DETAILED DESCRIPTION

Figure 1:
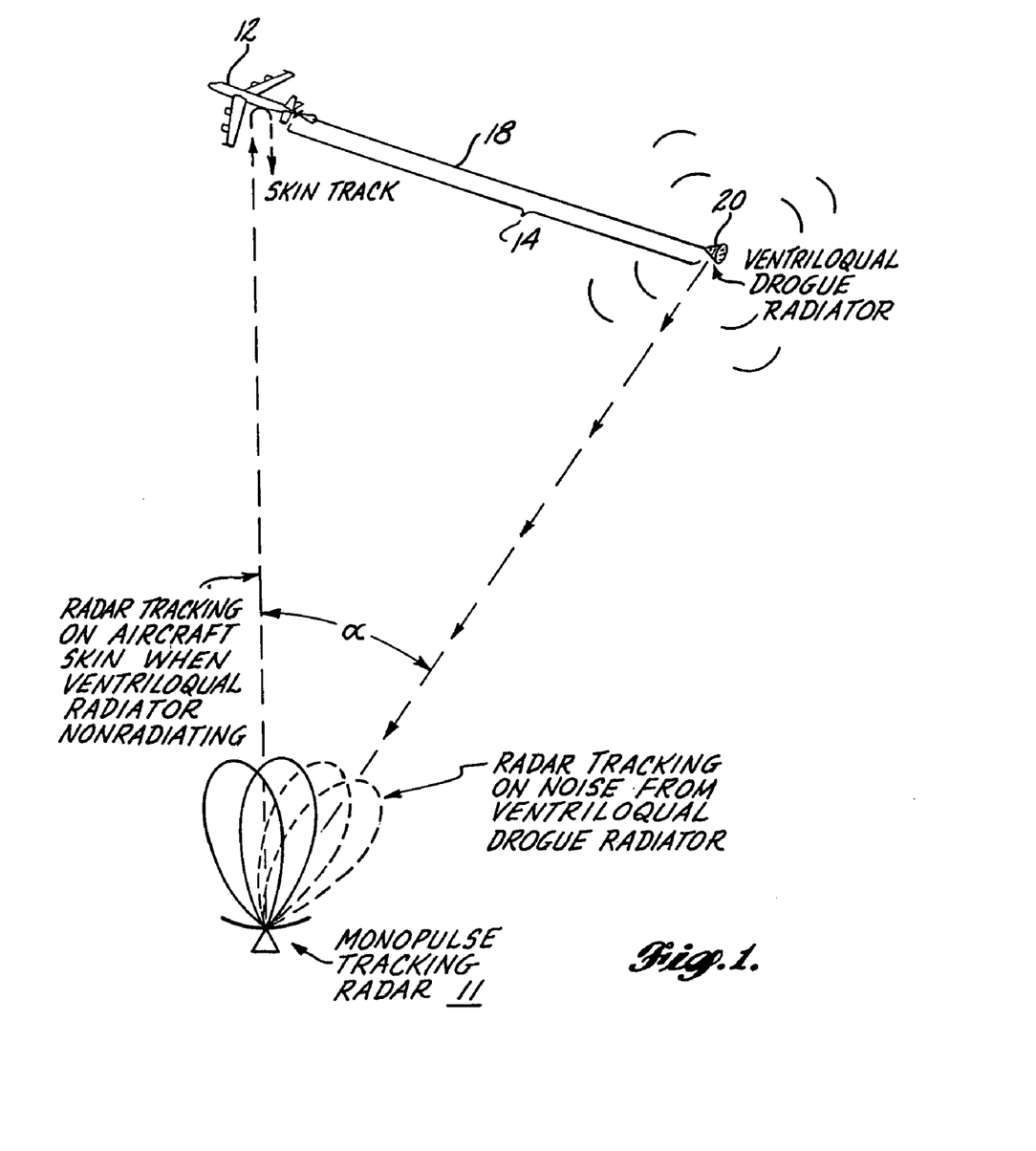
FIG. 1 is a generalized view of the ventriloqual-like radar jamming system illustrating a target aircraft towing the electromagnetic wave launcher, single wire transmission line and drogue radiator for radiating a radar jamming signal from a deceptive distance behind the aircraft position.

FIG. 1 illustrates how the ventriloqual-like jamming system radiates a radar jamming noise signal in a manner that denies radar 11, angle information of the position of a target aircraft 12, even though the signal receiving components of radar 11 are capable of homing on and tracking a noise source when the skin-reflected radar return signal is masked by radiating a jamming signal. Attached to aircraft 12 so as to be towed thereby is a single wire transmission line subsystem 14 including a wave launcher 16, a single wire transmission line 18 extending from a leading end which is mechanically and electrically coupled to the towing aircraft 12 by wave launcher 16. Line 18 terminates at a substantial distance behind aircraft 12, and a drogue radiator 20 is attached to the trailing end of the line.

As described in greater detail in the section herein dealing with the system's operation, radar 11 may in the absence of an effective jamming signal function to locate and track the actual position of the aircraft by receiving and processing the radar return signal reflected by the target aircraft. The position of the aircraft is located by its angular coordinates and range (distance) with respect to the location of radar 11.

If in an attempt to defeat skin tracking by radar 11, a noise jamming signal is radiated by and from target aircraft 12, many radar tracking systems such as radar 11, have alternative receiving modes which enable them to home on and track a noise signal source even though the return signal from the aircraft skin is masked by the jamming signal. Hence, radar 11 functioning in such a noise tracking mode will continue to provide the angle information of the position of aircraft 12, even though the range information is denied because of the masking effect of the jamming signal.

With the addition of the single wire transmission line subsystem 14, a ventriloqual-like radiation of the noise signal is achieved so that the tracking radar 11 is denied both range and angle information. The noise signal generated onboard aircraft 12 is coupled by launcher 16 to the leading end of the single wire transmission line 18 which is characterized by low loss and low leakage transmission. The noise signal energy travels, as a surface wave, the length of line 18 to the trailing end thereof where the energy is intercepted by drogue radiator 20 and radiated thereby transversely outwardly from that location, such that a portion of the radiation propagates toward the tracking radar 11. The length of transmission line 18 is selected so that the angle error between the actual position of aircraft 12 and the apparent position (because of the noise source) at drogue 12 is, for a typical range from radar 11, greater than the destruction radius of any anticipated anti-aircraft weaponry. Thus, the angle a that is subtended at the tracking radar 11 by the length of the single wire transmission line 18 should be large enough given the distance (range) of aircraft 12 from radar 11 to dispose drogue radiator 20 far enough behind aircraft 12 so that artillery, armed missiles or rockets, when exploded in the vicinity of the drogue radiator will not inflict disabling damage on aircraft 12.

Figure 2:
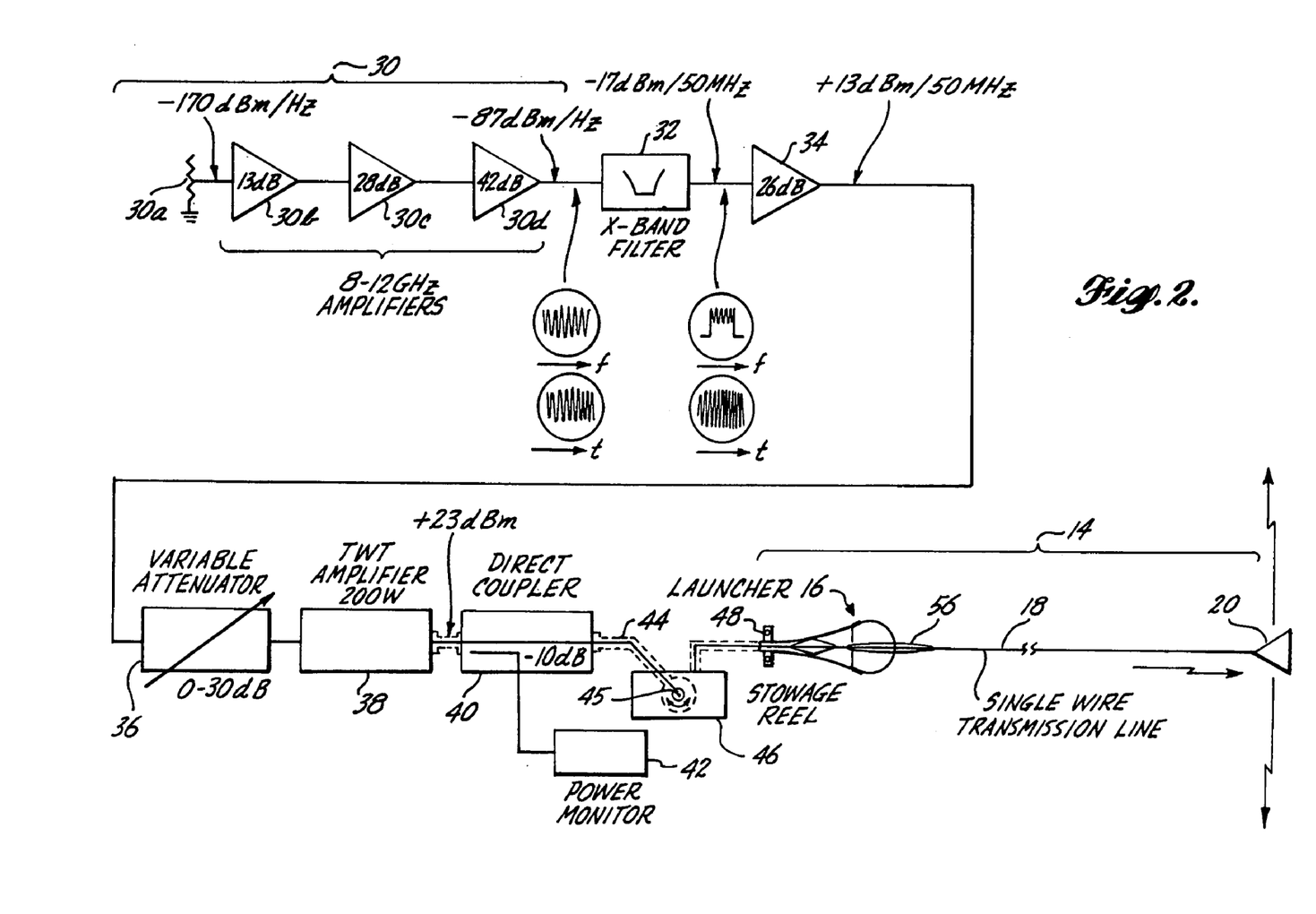
FIG. 2 is a detailed, block diagram of the noise signal jamming system including the noise generator and power amplifier in combination with a line stowage reel, an electromagnetic wave launcher and the towed single wire transmission line with the drogue radiator.

Now with reference to FIG. 2, the single wire transmission line subsystem 14 is driven by an onboard noise signal generator and power amplifier that includes a wideband noise signal source 30 and suitable filtering, preamplification, variable gain control and power amplification provided here respectively by an X-band filter 32, an amplifier 34, variable attenuator 36 and a traveling wave tube (TWT) amplifier 38. Generator 30 provides a source of essentially white noise by tapping the thermal noise existing in a resistor 30a and then successively amplifying the thermal noise in a plurality of cascaded, microwave amplifiers 30b, 30c and 30d. In this embodiment, these cascaded amplifiers have a one octave wide bandwidth of 6 to 12 gigahertz so as to receive the low level noise signal from resistor 30a (at −170 dbm/Hz) and successively raise the signal level by 13 db, 28 db and 42 db to a level of −87 dbm/Hz at the output of generator 30.

The thusly generated noise signal is now applied to an X-bandpass filter 32 that slices from the broadband noise signal, a noise spectrum of several tens of megahertz centered about the mid-frequency of the bandpass of microwave amplifiers 30b, 30c and 30d. The slice of noise signal energy from filter 32 is now further amplified by amplifier 34 having a 26 db gain to bring the signal strength up to a level suitable for power amplification by the traveling wave tube amplifier 38. Variable attenuator 36 serves to adjust the gain of the signal to a desired level prior to power amplification. The output of TWT amplifier 38 brings the signal level up to +23 dbm from the +13 dbm per 50 megahertz at the output of amplifier 34. The noise signal has now been power amplified to about 200 watts, sufficient to cause approximately 10–20 watts to be radiated by drogue radiator 20 of subsystem 14. To monitor the power level of the transmit signal, as it exists at the output of power amplifier 38, a direct microwave coupler 40 is inserted in series between amplifier 38 and the transmission line subsystem 14, and a power monitor 42 is connected via coupler 40 to provide a measured indication of the transmitter output wattage.

From direct coupler 40, the transmit signal energy is fed through a coaxial cable 44 to subsystem 14. A junction exists between coaxial cable 44 and the single wire transmission line 18 in a manner described more fully below in connection with FIGS. 3*a* and 3*b*. Between coupler 40 and launcher 16 of subsystem 14, as schematically shown, a stowage reel 46 is provided including such means as a rotary coaxial joint 45 mounted at the hub of reel 46 for connecting a nonrotating section of cable 44 from coupler 40 to another section of cable 44 which along with line 18 is wound on rotatable reel 46. A means is thereby provided for stowing single wire transmission line 18 and a feed section of coaxial cable 44 when line 18 is retracted from the extended position as it is shown in FIGS. 1 and 2 by drawing the line forwardly through a sliding coupling with launcher 16 until drogue 20 is pulled up against launcher 16. Although not shown in the drawings, stowage reel 46 is mounted onboard aircraft 12 at a location adjacent an opening in the aircraft body in registration with launcher 16 which is mounted on the exterior of the aircraft. Reel 46 is thus positioned for selectively dereeling line 18 to deploy the single wire transmission line subsystem 14 and to retract the line so as to draw drogue radiator 20 up against launcher 16.

Figure 3A:
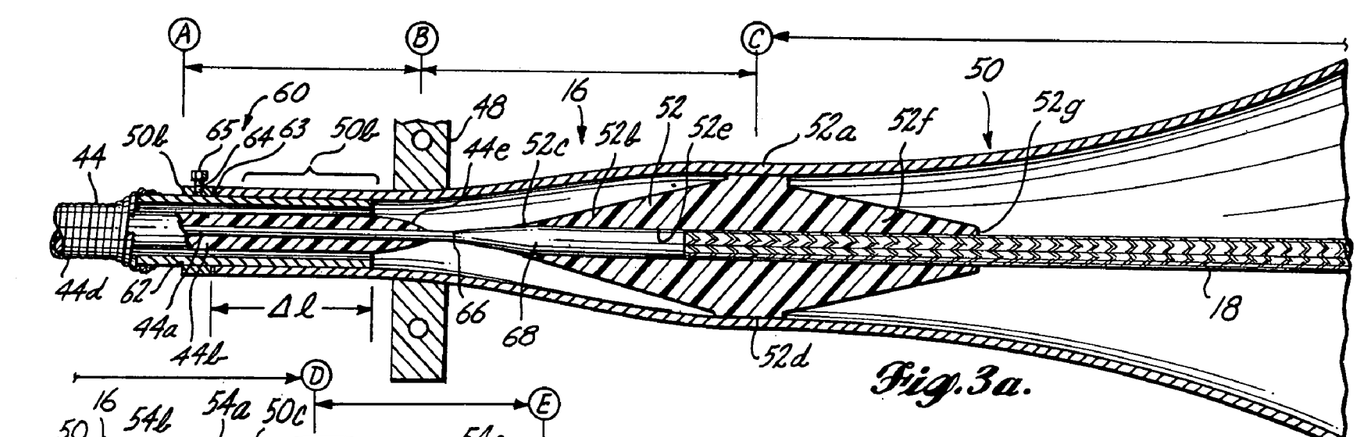
FIGS. 3a and 3b together show a detailed, axial sectional view of the axisymmetric wave launcher, single wire transmission line and drogue radiator.

As shown in greater detail in FIG. 3*a*, the center conductor of coaxial feed cable 44 is joined by a tapered transition conductor to a leading end of the single wire transmission line 18 and the outer conductor of cable 44 is adapted to be removably connected to the constricted end of launcher 16 when line 18 is fully deployed. Thus, when line 18 is to be retracted, storage reel 46 is adapted to first wind in a short section of coaxial feed cable 44 that is disposed between reel 46 and the constricted end of launcher 16 and thereafter to continue winding in the single wire transmission line 18 until as mentioned above drogue radiator 20 is pulled up against the launcher. In this embodiment, launcher 16 is mounted to the exterior of aircraft 12 by suitable means such as enabled by the mounting bracket 48 illustrated in FIGS. 2 and 3*a* of the drawings.

Figures 3B, 4, 5:
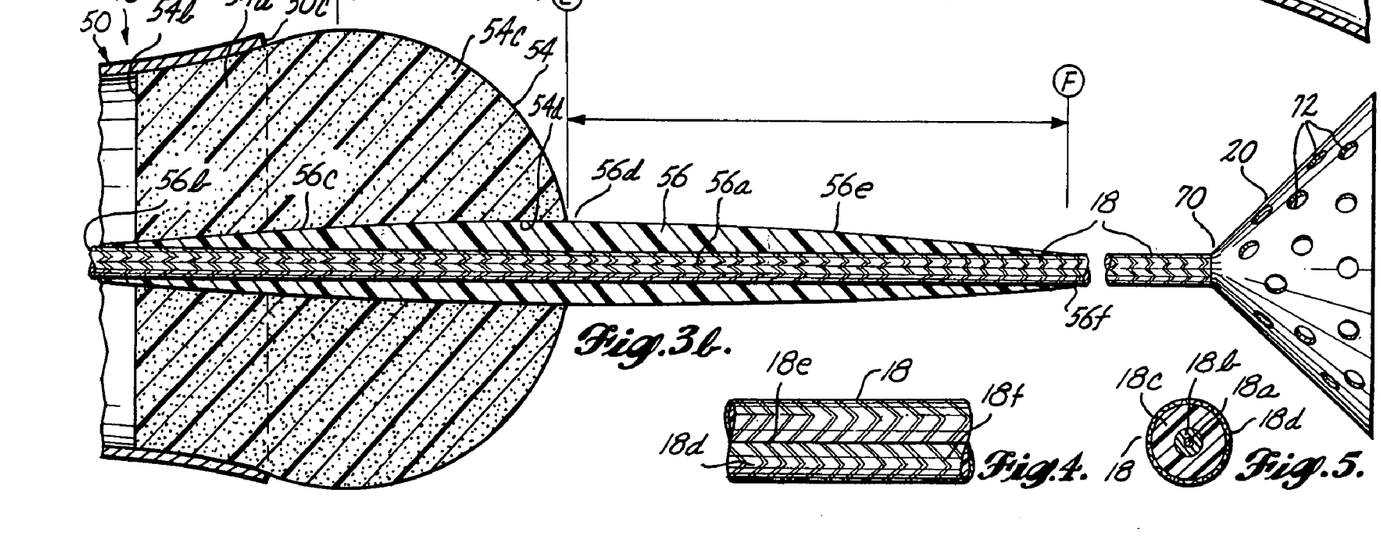
FIG. 4 is an enlarged, detailed, elevational view of a lengthwise segment of the single wire transmission line.
FIG. 5 is a detailed, cross section view of the single wire transmission line of FIG. 4.

With reference to FIGS. 3*a* and 3*b* which show line 18 in its fully deployed position, launcher 16 includes the principal components of a horn structure 50, and dielectric structures 52, 54 and 56, all of which are axisymmetric about the centerline of transmission line 18. Horn structure 50 has a constricted end 50*a* including a tubular section 50*b* of substantially uniform diameter for with an adjustable impedance matching coupling 60 that mechanically and electrically joins coaxial feed cable 44 to horn structure 50. From constricted end 50*a*, horn 50 flares outwardly, in accordance with an exponential divergence per unit axial length, terminating at a flared end 50*c* downstream of which the horn bounded electromagnetic noise signal energy is launched as a surface wave onto the conductor provided by line 18.

Adjustable coupling 60 is provided by a tubular member 62 dimensioned so as to slidably (telescopically) fit inside of tubular section 50*b*. A stop ring 64 slips over member 62 and can be locked in a fixed axial position on member 62 by screw 65, so as to abut against an end 63 of the tubular section 50*b* of horn structure 50. The non-inserted end of tubular member 62 is mechanically and electrically joined to the outer braided conductor of coaxial cable 44 by means such as soldering or brazing. In this manner, coupling 60 provides a slidable adjustment between member 62 and tubular section 50*b* over an adjustment distance Δ1 for impedance matching the coaxial feed cable 44 to the input end of horn 50.

Cable 44 is of a conventional coaxial type, including a center conductor 44*a*, a braided outer conductor protective sheath 44*d* which as mentioned above is soldered or brazed to the noninserted end of member 62, and dielectric body 44*b* disposed between conductors 44*a* and 44*d*. To join cable 44 to member 62 the outer braided conductor 44*d* is stripped back a distance somewhat greater than the overall length of tubular member 62. Member 62 is now slid over the thusly exposed body of dielectric 44*b* so that the end of body 44*b* and the inner conductor 44*a* project beyond the inserted end of member 62. The braided conductor 44*d* is now soldered or brazed to the opposite end of conductor 62.

Adjacent the inserted end of member 62 dielectric 44*b* of cable 44 is tapered down to inner conductor 44*a* as indicated at 44*e* and the terminal end of inner conductor 44*a* is electrically and mechanically joined as indicated at 66 to the smaller end of a tapered transition conductor 68 of increasing diameter in the direction toward the single wire transmission line 18. The larger end of transition conductor 68, which for example may be of solid brass or other conductive metal, is mated to and is mechanically and electrically joined to a matching diameter of a leading end of single wire transmission line 18.

Dielectric structure 52 serves to center transition conductor 68 and the adjoining leading end of single wire transmission line 18 at an axially intermediate position within horn structure 50 and is shaped and mated to horn structure 50 so as to minimize any impedance discontinuity occasioned by the presence of its dielectric body, which has a dielectric in excess of that of free space so as to have a material effect on the electromagnetic signal energy. For this purpose horn structure 50 is shaped as follows. Commencing at a location along the axis of launcher 16 that lies in transverse registration with the taper 44*e* on the body of dielectric 44*b*, and hence downstream of tunable coupling 60, horn structure 50 enlarges in diameter along its axis of symmetry and then with a decreasing amount of divergence until reaching the midsection of 52*a* of dielectric structure 52, where the interior diameter of horn 50 is approximately constant along the axis. The initial enlargement of horn structure 50 followed by a decreasing amount of divergence along the axis, coincides with the position of a leading taper 52*b* on dielectric structure 52 that commences at an end 52*c* disposed axially downstream of the junction 66 between transition conductor 68 and the inner conductor 44*a* of cable 44. The initial enlargement of horn structure 50 in registration with the leading taper 52*b* of structure 52 provides a smooth impedance transition in this region.

The midsection 52*a* of dielectric structure 52 is fixedly attached to the interior surface of horn structure 50 so that structure 52 is prevented from sliding axially forwardly or rearwardly as line 18 and transition conductor 68 are fed through a central bore 52*e*.

Continuing toward the flared end 50*c* of horn structure 50 from the midsection 52*a* of dielectric structure 52, the wall of horn structure 50 again commences to diverge outwardly here in an exponential fashion along the axis of the structure and such outward divergence is in registration with a trailing taper 52*f* on structure 52. Like the leading taper 52*b*, the trailing taper 52*f* of structure 52 provides a smooth, blended impedance transition for the axially propagating electromagnetic energy where the decreasing amount of dielectric material associated with taper 52*f* gradually releases the electromagnetic energy into the lower dielectric volume associated with the air space existing between horn structure 50, and structure 52. Taper 52f terminates at an end 52g at which the electromagnetic energy is contained totally within the air space dielectric.

End 52g of the trailing taper 52f of structure 52 terminates substantially upstream of end 50c of horn structure 50 as depicted in the composite of FIGS. 3a and 3b. Between dielectric structure 52 and end 50c of horn structure 50, the wall of the horn diverges outwardly in an exponential flare.

Adjacent end 50c of horn 50, a bulbous shaped dielectric guide structure 54 is disposed to serve as a support structure for maintaining an elongate, double tapered dielectric lens structure 56 coaxial with the centerline of horn structure 50. A rearward portion 54a of guide structure 54 has a circumferential surface mated to the interior flare of horn 50 and terminating at a transverse plane 54b. Projecting downstream of end 50c guide structure 54 has a generally semispherical, bulbous portion 54c defining an axis of symmetry that is coaxial with the centerline of horn structure 50 and line 18. Dielectric guide structure 54 is, unlike structure 52, selected to have a dielectric constant that is approximately that of free space so as to be inert with respect to the transmission of electromagnetic energy. This is achieved by using a material such as rigid, polyurethane foam. In particular, such a foam having a density of 2 lbs/ft$^3$ has been found suitable for use as dielectric structure 54.

Dielectric lens structure 56 is tapered at both axial ends and is secured in coaxial alignment with the centerline of horn structure 50 by a matingly tapered opening 54d provided in foamed dielectric structure 54. An axial bore 56a extends the entire length of lens 56 from an end 56b of the leading taper 56c, through a midsection 56d of maximum diameter and through a trailing taper 56e that terminates at a trailing end 56f. The leading taper 56c and the dielectric constant of lens structure 56 are selected so as to compensate for the otherwise abrupt impedance transition existing at the termination of flared end 50c of horn structure 50 by causing a portion of the electromagnetic energy emerging from the horn to be concentrated in the body of lens structure 56. In so doing, the radially oriented E (electric) fields of the TEM electromagnetic waves are compressed relative to the radial extent of such fields in the absence of dielectric lens structure 56. Downstream of the maximum diameter midsection 56d of lens structure 56, the compressed E fields of the wave energy are allowed to expand gradually in the trailing taper 56e, to blend the emerging wave energy with the steady state surface wave propagation along line 18. Once launched onto line 18, the wave energy is in effect "glued" to the conductive surface of the single wire transmission line in accordance with the teachings of A. Sommerfeld and G. J. E. Goubau as disclosed in U.S. Pat. No. 2,685,068 issued to Goubau on Jul. 27, 1954. As described more fully below in connection with FIGS. 4 and 5, line 18 in the preferred embodiment has an outer conductive surface in which the propagating electromagnetic wave energy is compressed around the line by the presence of slight DC resistance in the surface conductor, rather than by using a sheathing of dielectric material around a core conductor as in the case of a Goubau transmission line. By using a coaxially cable feed into the constricted end of horn structure 50, a broadband coupling is achieved between coaxial cable 44 and the horn as compared to the use of a resonant cavity coupling which is inherently narrowband. Additionally, the exponential divergence of horn structure 50 downstream of the midpoint of guide structure 52, causes the launcher to be less frequency sensitive, enhancing its broadband performance, as does the leading taper 56c of dielectric lens structure 56.

Further still, the exponential shaping of horn structure 50 together with the provision of lens structure 56 minimizes the diameter of horn structure 50 at the launching end 50c even though line 18 is a Sommerfeld line which, as discussed more fully hereinafter, exhibits a relatively larger diameter energy bundle than a Goubau transmission line, hence suggesting the need for a substantially larger diameter launcher than has been found needed in actual practice.

With reference to FIGS. 4 and 5, line 18 is formed of an innermost solid nylon tension strand 18a surrounded by a braided multifiber cord 18b made of synthetic fiber strands which coact with the solid nylon strand 18a to provide tension strength for line 18 while also allowing it to remain flexible for coiling on stowage reel 46. Surrounding cord 18b is a homogeneous body 18c of foamed synthetic material such as polypropylene to provide a relatively large diameter circumference onto which a thin conductive sheath 18d is provided by wrapping a web of aluminum foil around body 18c and finishing the wrap with a lengthwise seam 18e. After the conductive foil 18d is applied to the dielectric body 18c, it is embossed with a herringbone pattern of alternating ridges and furrows indicated at 18f such as by initially applying a braided, conductive sheath about line 18 and then removing the braiding to leave the herringbone embossed surface 18f on the exterior of line 18 as best shown by FIG. 4. In this particular embodiment, the manufacturing steps used in forming line 18 are substantially the same as those used to make a durable, coaxial cable used in closed circuit television transmission except that the outer braided sheath is first applied and then removed in the present embodiment to form the herringbone embossed surface 18f, whereas in case of the coaxial cable the sheath is permanently retained. Also, in the case of the coaxial cable transmission line, the innermost core of the line is a solid copper conductor, rather than the nonconductive nylon strand 18a and braided fiber cord 18b shown in FIG. 5.

Since the transmission mode of line 18 is a surface wave rather than a bounded wave inside a coaxial cable the innermost conductor is omitted in line 18 to reduce the weight of the towed line and to increase its flexibility for coiling on storage reel 46. The embossed surface 18f of conductive foil 18d allows the foil to be compressed and stretched so as to avoid an unwanted tendency present in a smooth, unwrinkled conductive foil to shingle and buckle when line 18 twists in flight and when it is coiled even on a relatively large diameter drum of a storage reel. Unlike the uniformity of the herringbone embossed surface 18f, random shingling of a conductive foil on the line will severely disrupt the surface wave transmission characteristics of the electromagnetic energy and cause some of the energy to be leaked transversely from the line before reaching drogue radiator 20. By way of example, a line 18 formed in the manner described is capable of being stowed on a one foot diameter drum without causing any permanent deformation of the conductive foil 18d that would interfere with the transmission of the electromagnetic energy as a surface wave in accordance with the Sommerfeld principle.

The trailing end of line 18 is mechanically and electrically joined as indicated at 70 in FIG. 3b to the apex of a rearwardly divergent conical drogue 20 which is hollow and open to the rear. Air flow perforations 72 are provided in the wall of conical drogue radiator 20 for stabilizing the flight of the drogue and to balance the lift-to-drag ratio of drogue radiator 20 to that of line 18. It is noted that the flight characteristics of line 18 are substantially dictated by those physical characteristics of line 18 which allow it to function as a transmission line. By aerodynamically configuring drogue radiator 20 to provide a lift-to-drag ratio that approximates that of line 18 itself, the flight of line 18 and drogue radiator 20 attached thereto tends to be stable, without significant bending that would interfere with the transmission characteristics of line 18 as a single wire line transmission system. Also, drogue radiator 20 helps dampen any tendency of air turbulence to induce traveling or galloping waves in the line 18 which also can significantly interfere with its electrical transmission properties.

Based on the above-disclosed principles of launcher 16, line 18 and drogue radiator 20, a single wire transmission line subsystem 14 has been constructed and tested over a relatively broadband frequency range of 6 to 18 gigahertz. Moreover, it has been demonstrated that the lower limit of the bandwidth is actually about 2 gigahertz, such that the overall bandwidth is several octaves.

At these frequencies, the following specifications and dimensions for the coaxial feed cable 44, launcher 16, line 18 and drogue radiator 20 were used. Coaxial cable 44 is a conventional 50 ohm coaxial cable while the single wire transmission line 18 has an air space impedance of approximately 400 to 600 ohms. Thus, launcher 16 must provide a low loss broadband coupling between the relatively low impedance of the coaxial feed cable 44 and the substantially higher impedance of single wire transmission line 18. In this particular embodiment, given the required impedance transition, bandwidth and frequency range, the tubular section 50b of horn structure 50 is approximately two inches in length, while the insertable tubular member 62 connected to the shield of cable 44 is one and three-quarters inches long for a tuning distance of Δ1 between locations A and B (indicated in FIG. 3a) of slightly over one-half of an inch. At location B corresponding to the constricted end of horn structure 50, the inside diameter of the horn wall is approximately 0.25 inches. The distance between locations B and C is approximately 3 inches and the inside horn diameter at location C is about 0.625 inch. Transition conductor 68 is made of brass and is approximately 1.35 inches long and joins the outer conductive foil of line 18 at a junction that is disposed intermediate the ends 52c and 52g of dielectric 52 when the line is fully deployed as depicted in FIGS. 3a and 3b. Between locations C and D, horn structure 50 flares outwardly in the above-described exponential fashion from the inside diameter of approximately 0.25 inches at location B to a maximum inside diameter of 4 inches at location D corresponding to end 50c of the horn. More generally, horn structure 50 diverges exponentially from an inside diameter of approximately one-quarter of an inch at location B to a maximum diameter of from 2–5 $\lambda_0$ (wave lengths) over a length of from 4–8 $\lambda_0$ (wave lengths), where $\lambda_0$ is the mean wave length of the broadband noise signal.

Dielectric guide structure 52 is in this embodiment made from a synthetic material such as polytetrafluoroethylene having a dielectric constant of approximately 2.1, and has an overall length between the leading and trailing ends 52c and 52g of 3.5 inches and a maximum diameter of 0.625 inches. Each end of structure 52 is tapered down to approximately the diameter of the through bore which is 0.25 inch, or somewhat larger than the diameter of line 18 to permit the line and the larger end of transition conductor 68 to slide through the launcher assembly during deployment and retraction.

The size and configuration of guide structure 54 is not critical and need merely be dimensioned and mounted so as to securely center dielectric lens structure 56 coaxially with horn structure 50 and at a fixed axial position with respect to the end 50c of the horn. As mentioned, structure 54 has a dielectric constant approximately that of air so as to not alter the propagation of the electromagnetic wave energy other than that which would occur because of the presence of the air dielectric. On the other hand, dielectric lens structure 56 is made of a dielectric material such as polytetrafluoroethylene having a dielectric constant of approximately 2.1 to achieve the above-mentioned gradual compression of the electromagnetic energy as it emerges from the end 50c of horn structure 50 followed by a gradual expansion of the bundle of energy as it becomes launched as a steady state surface wave onto single wire transmission line 18. For this purpose, the maximum diameter of dielectric lens structure 56 at location E is approximately 0.4 inches and its overall length between the leading and trailing ends 56b and 56f is approximately 16 inches. The midsection 56d where the diameter of dielectric lens structure 56 is at a maximum is disposed at approximately 0.5 inch beyond the end 50c of horn structure 50.

Single wire transmission line 18 having the above-described configuration is selected in this embodiment to have an overall outer diameter of 0.2 inches measured with respect to the outer surface of foil 18d. The thickness of foil 18d is approximately 0.001 inches. A line 18 constructed thusly has a weight of approximately one pound per 100 feet. The length of line 18 between transition conductor 68 and drogue radiator 20 may vary within the broad constraint of disposing drogue 20 sufficiently behind the aircraft to place the aircraft outside the destructive radius of anti-aircraft weaponry. By way of example, line 18 may be from 100 to 1,000 feet in length. At the greater length of 1,000 feet, the loss in power is less than 8 db at 10 gigahertz.

It has been found that a line 18 constructed as a Sommerfeld line and hence without a Goubau dielectric coating on the outer conductive surface, has sufficient resistance in the aluminum foil as used in the preferred embodiment of line 18 to retard the propagation of that portion of the field lying close to the surface of the line. That phenomenon, in accordance with the principles of the Sommerfeld line, compresses or holds the bundle of electromagnetic energy to the line and hence guides the energy without allowing it to radiate radially outwardly from the line. While such a Sommerfled line 18 exhibits a larger radial field than the surface coated Goubau line, nevertheless line 18, when used in combination with the wave launcher 16, provides an efficient transmission device together with a low leakage and low weight to length ratio which are desirable in this environment.

In this same embodiment, drogue radiator 20 is made of a conductive sheet metal formed to the shape of a cone having a 45° slant. The smaller end of the cone is truncated and mated to the diameter of line 18, while the larger and trailing end of the cone has a diameter of at least four inches. More specifically, the maximum cone diameter is selected to intercept the bulk of the bundle of electromagnetic energy that is traveling in an imaginary tube along line 18. A four inch diameter cone is estimated to intercept approximately 96 percent of the wave energy at 9.5 gigahertz. The amount of energy intercepted and hence radiated by the drogue can be enhanced further by using a delaunching dielectric lens at the leading axial end of the conical drogue as described more fully hereinafter in connection with an alternative embodiment of the drogue radiator shown in FIGS. 6 and 7.

Operation

During takeoff and nonstealth flight, the ventriloqual-like jamming system shown in FIGS. 1 and 2 is disposed in a retracted or stowed configuration by coiling line 18 onto the stowage reel 46, thereby drawing drogue radiator 20 up against the dielectric lens 56 of launcher 16. When radar deception is desired, stowage reel 46 is operated to feed out line 18 through the launcher 16 during which time drogue radiator 20 acts as a drag at the trailing end of line 18 to apply tension to the line and assist in pulling the line out into a trolling configuration behind the aircraft. The deployment of single wire transmission line 18 and drogue radiator 20 continues in this manner until the transition conductor 68 between line 18 and the center conductor 44a of cable 44 (see FIG. 3a) approaches the constricted end 50b of horn structure 50. At this time, tubular slide member 62, which is connected to shield 44b of cable 44, slides into the tubular section 50b of horn structure 50. The impedance matching adjustment Δ1 has been previously set by adjusting slidable ring 64 to a position that has been predetermined to provide the optimum impedance match between cable 44 and the impedance at the constricted end of horn structure 50. And hence, screw 65 has been previously tightened to secure ring 64 to member 62 so that member 62 is at a fixed axial position with respect to tubular section 50b when the single wire transmission line 18 is fully deployed.

Noise generator 30 and the various amplification stages associated therewith are powered up to transmit the relatively broadband noise signal out over coaxial feed cable 44 to the single wire transmission line subsystem 14. For radar jamming, a relatively broadband noise signal is used that lies within the frequency range of the anticipated tracking radar and at a radiated power level that is approximately 10 db or greater than the skin reflected radar return signal that is to be masked. For example, a frequency range of from 6 to 18 gigahertz has been transmitted by the embodiment of the invention disclosed herein at a radiated power of about 10–20 watts. This microwave signal is efficiently launched by launcher 16 onto single wire transmission line 18 where the energy is propagated along the line in a surface wave mode with only minimal and tolerable leakage from launcher 16 and line 18. This minimal leakage is at a power level that is so much lower than the energy radiated by drogue radiator 20, that the jamming signal from the drogue predominates so as to cause tracking radar to home-in only on radiator 20. In the preferred embodiment constructed as disclosed above, the leakage from the launcher 16 and intermediate sections of line 18 is at least 20 db below the power level radiated by drogue radiator 20.

When single wire transmission line subsystem 14 is deployed in flight, drogue radiator 20 and line 18 by virtue of matching their lift to drag ratios, cause line 18 to fly in a substantially straight path, with only slight curvature during certain maneuvers and wind conditions. Such minimal curvature has been found to not significantly degrade the characteristically high transmission efficiency of single wire line 18. Moreover, in most anticipated flight conditions, the line 18 is not interfered with by such earthbound environmental conditions as snow, rain, ice or birds which have tended to detract from the practical applications of such a transmission system when the line is strung on telephone poles or the like.

The ventriloqual jamming signal radiated from drogue 20 as shown in FIG. 1 does not require detailed or particular preknowledge of the tracking radar 11 which may be encountered. The noise energy generated and transmitted by the system masks such information as the range of the towing aircraft 12 from radar 11 and denies angle information that might otherwise be obtained by tracking systems that home-in on a noise source. The ventrilogual jamming signal is thus effective against many radar types and is relatively uncomplex in design and hence is reliable in operation and easy to maintain. Moreover, it is effective against such sophisticated tracking radars as the monopulse type, which is one of the most accurate tracking radar systems in terms of producing angle information.

ALTERNATIVE EMBODIMENT

Figures 6, 7:
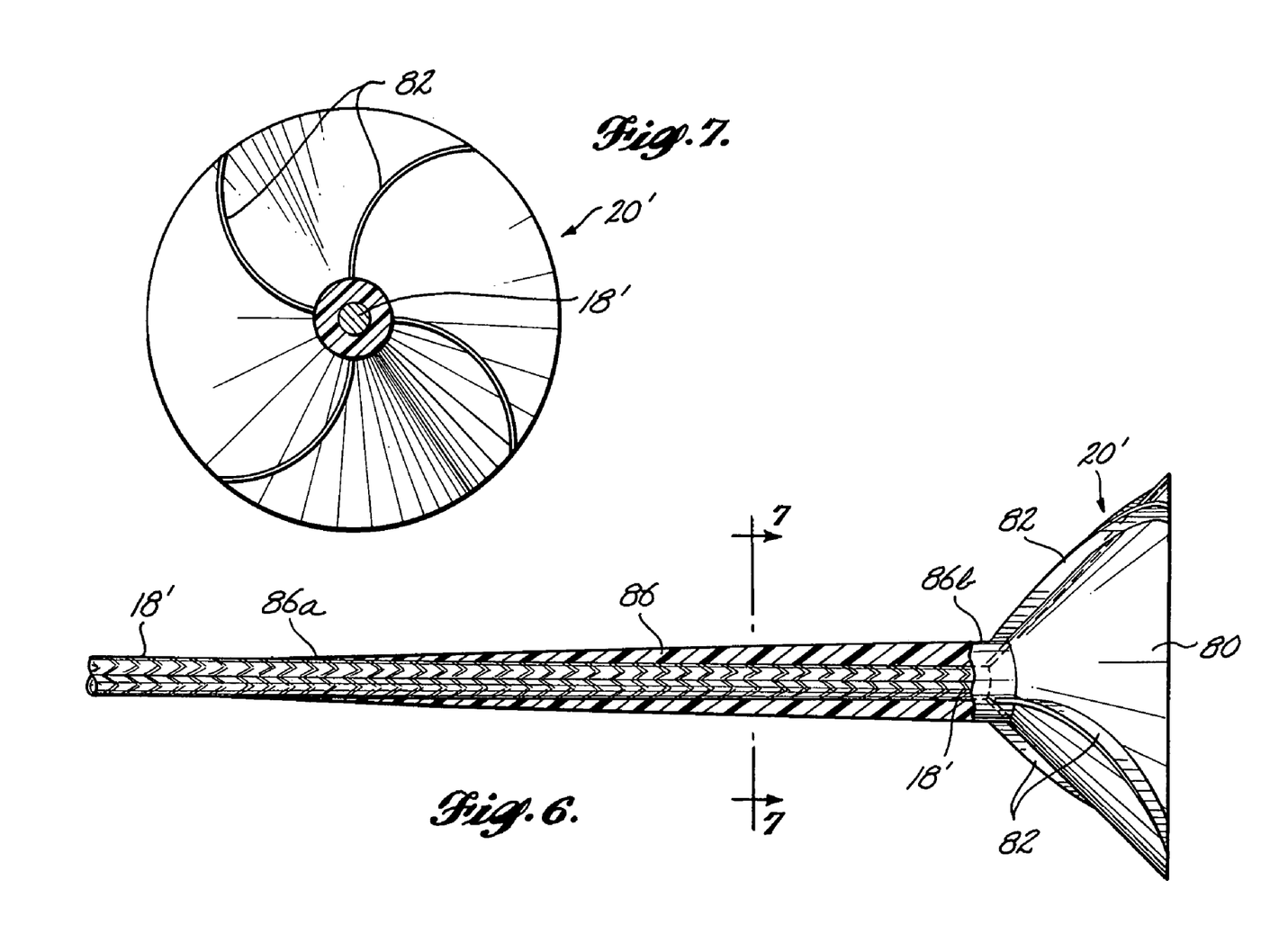
FIG. 6 is a view, partly an axially section, similar to FIG. 3b, showing an alternative configuration of the drogue radiator, and an associated delaunching dielectric lens for causing the electromagnetic energy of the radar jamming signal to be efficiently coupled to and thence radiated by the drogue.
FIG. 7 is an axial, end view of the drogue radiator of FIG. 6, looking aft along the single wire transmission line toward the apex of the conical shaped drogue.

With reference to FIGS. 6 and 7, an alternative drogue configuration is depicted in which a drogue radiator 20' is formed by a conically shaped conductive body 80 having on its outer and forwardly oriented face, radially outwardly spiraled fluting 82 shaped to effect polarization of the radiated E-fields. Fluting 82 is formed by a plurality of radially outwardly spiraling ridges of metal and/or dielectric material wherein the particular height and degree of spiraling determines the specific type of polarization that is achieved, e.g., circular polarization, slant linear polarizaton or circumferential polarization. By creating such complex polarization in the reflected electromagnetic wave energy, the jamming signal energy radiated by drogue 20' is far less susceptible to being tuned out by tracking systems having the capability of receiving radar return signals of only certain and selected polarization. In other words, it is difficult to tune out such complex polarization as circular, slant linear and circumferential.

Additionally, in this embodiment of the drogue radiator 20', the maximum diameter of the conical reflector body 80 is minimized by incorporating a wave delaunching axisymmetric dielectric lens structure 86 adjacent the junction between the trailing end of single wire transmission line 18' and the apex of the drogue's conical body 80. More particularly, lens structure 86 is made of a material having a dielectric constant substantially greater than that of air and has an axisymmetric shape that forms a tapered tubular body surrounding the foil conductor of line 18'. The taper of lens structure 86 is such as to increase in diameter in a direction toward radiator 20' commencing at a leading end 86a where the radial thickness of structure 86 is at a minimum and increasing in thickness to the terminal end 86b where both the end of line 18' and the trailing end of lens structure 86 are joined to the apex of conical shaped drogue body 80. The length of lens structure 86 is approximately 16 inches or 12 $\lambda_0$ (wave lengths) and in this embodiment corresponds to the length of the trailing taper 56e of dielectric lens structure 56 of launcher 16 (FIG. 3b).

Hence delaunching lens structure 86 functions in a manner similar to and as the counterpart of the trailing taper 56e of lens structure 56 that projects from the horn of launcher 16 by gradually compressing the cylindrical bundle of electromagnetic energy traveling rearwardly on transmission line 18' into a successively smaller and smaller diameter. By so doing, the maximum diameter of conical body 80 of drogue radiator 20' is minimized while still be large enough in the transverse plane to intercept the major portion of the total transmitted noise energy. While dielectric lens structure 86 is shown in connection with the modified drogue radiator 20' in FIGS. 6 and 7, it will be appreciated that a corresponding delaunching lens structure may be incorporated with the above-described drogue radiator 20 and the associated single wire transmission line 18 of FIG. 3b. Similarly, the conical body 80 of drogue radiator 20' may be modified by the provision of flight stabilizing air flow apertures 72 as provided on drogue radiator 20 (FIG. 3b).

While only particular embodiments have been disclosed herein, it will be readily apparent to persons skilled in the art that numerous changes and modifications can be made thereto including the use of equivalent means, devices, and method steps without departing from the spirit of the invention. For example, the ventriloqual-like radar jamming system may be used in the improved combination jamming and anti-signal integration method and apparatus disclosed and claimed in a copending U.S. Application Ser. No. 225,699, filed Jan. 16, 1982 by Walter E. Buehler, Roger M. Whitson and Michael J. Lewis, for ANTI SIGNAL-INTEGRATION APPARATUS AND METHOD FOR COUNTERING INTEGRATION ENHANCEMENT OF RADAR RETURN SIGNALS MASKED BY AIRBORNE VENTRILOQUAL-LIKE NOISE JAMMING.

The embodiments of the invention in which an exclusive property or privilege is claimed are defined as follows:

1. A radar jamming system adapted to be carried by an aircraft that is seeking to avoid being located by radar, comprising:
  a noise signal generator including a noise signal source and power amplification means, said generator being adapted to be carried by an aircraft;
  a single wire transmission line having a leading end that is adapted to be secured to an aircraft for being towed thereby and having a trailing end;
  an electromagnetic wave launcher means coupling said noise signal generator to the leading end of said single wire transmission line for launching a noise signal as a surface wave onto said transmission line; and
  passive radiator means attached to said single wire transmission line adjacent the trailing end thereof for intercepting noise signal surface waves transmitted along said single wire transmission line and causing the associated electromagnetic noise energy to be radiated outwardly from the axis of the line adjacent the trailing end thereof.

2. The system of claim 1 wherein said passive radiator has an airfoil configuration so as to act as a drogue adjacent the trailing end of said transmission line for stabilizing flight of said transmission line and said passive radiator.

3. The system of claim 1 wherein said launcher means comprises:
  a feed coaxial cable having an inner conductor, an outer conductor and a dielectric body therebetween, extending from said noise signal generator means;
  a horn structure having constricted and flared ends and an interior wall surface made of an electrically conductive material, said horn structure being adapted at its constricted end to receive said feed coaxial cable so that the inner conductor of said cable is coaxially inserted into said constricted end and is physically spaced from the interior wall of said horn structure by said dielectric body and the outer conductor of said coaxial cable is in circumferential contact with said constricted horn end so as to be in electrical communication with said interior wall of said horn structure;
  an elongate conductor at a leading end of said single wire transmission line being electrically and mechanically coupled to the inner conductor of said coaxial cable coaxially within and adjacent said constricted end of said horn structure, said conductor of said single wire transmission line extending from said inner conductor of said cable coaxially of said horn structure and emerging from the flared end of said horn structure as a single wire transmission line; and
  annular dielectric structure means coaxially disposed with said horn structure and fixedly supported thereby, said annular dielectric structure means having a concentric bore slidably receiving said single wire transmission line.

4. The launcher means as set forth in claim 3 wherein said constricted end of said horn structure comprises telescoping tubular means for adjusting the length of said horn structure between said constricted and flared ends for adjustable matching the impedance of said coaxial cable to the impedance of said horn structure at its constricted end.

5. The launcher means as set forth in claim 3 wherein said inner conductor of said coaxial cable has an outside diameter that is different from the outside diameter of said conductor of said single wire transmission line, and further comprising an elongate transition conductor means for electrically and mechanically coupling said inner conductor of said coaxial cable to said conductor of said single wire transmission line, said transition conductor means being tapered so as to mate at one of its ends with the outside diameter of said inner conductor of said coaxial cable and so as to mate at its opposite end with the outside diameter of said conductor of said single wire transmission line.

6. The launcher means as set forth in claim 3 wherein said annular dielectric structure means comprises a first dielectric guide mounted coaxially within said horn structure intermediate said constricted and flared ends thereof, said first guide having its ends tapered in opposed axial directions from a mid-section of maximum outside diameter at which said first guide is fixedly and circumferentially supported by the interior wall of said horn structure.

7. The launcher means of claim 6 wherein said annular dielectric structure means further comprises a second guide having an annular body of expanded rigid synthetic material concentrically mated to the flared end of said horn structure and having a rounded end symmetric with the axis of said horn structure that protrudes axially from said flared end of said horn structure in the direction of said emerging single wire transmission line, and a dielectric lens coaxially supported by said second guide and having a concentric bore slidably receiving said single wire transmission.

8. The launcher means set forth in claim 7 wherein said dielectric lens is of generally elongate, tubular shape disposed at an axial position proximate said flared end of said horn structure, said dielectric lens being axially and oppositely tapered at its opposed ends so as to interact with said conductor of said single wire transmission line and said horn structure to provide a continuous impedance transition to the transmission of electromagnetic wave energy as such energy undergoes a transition between a bounded condition between the interior conductive wall of said horn structure and an outer surface of said conductor of said single wire transmission line and a surface wave condition in which such wave energy is unbounded and is guided by the conductor of said single wire transmission line.

9. The launcher means set forth in claim 8 wherein said dielectric lens has a circular cross section of maximum diameter at approximately midlength so that a leading tapered portion exists between a first end of said lens that is adjacent the constricted end of said horn structure and a section of maximum diameter, and a trailing tapered portion exists between said section of maximum diameter and a second end that projects outwardly from the flared end of said horn structure.

10. The launcher means as set forth in claim 9 wherein said section of maximum diameter of said dielectric lens is substantially less than the diameter of said flared end of said horn structure and is disposed axially downstream of said flared end of said horn structure.

11. The launcher means as set forth in claim 10 wherein said dielectric body of said second guide has a central bore that is oversized relative to the outside diameter of said single wire transmission line and that is mated to an outer diameter of said dielectric lens for supportively centering said dielectric lens and hence indirectly centering said single wire transmission line relative to the flared end of said horn structure.

12. The launcher means as set forth in claim 11 wherein said dielectric body of said second guide has a dielectric constant which approaches that of air, and said dielectric lens is made of a material that has a dielectric constant substantially greater than that of air.

13. The launcher means as set forth in claim 12 wherein said flared end of said horn structure has a diameter that increases as a nonlinear function of its axial length.

14. The system of claim 1 wherein said single wire transmission line comprises an inner supportive body of synthetic material and an outer sheath of electrical conductive foil.

15. The system of claim 14 wherein said foil is formed with circumferentially and axially distributed corrugations.

16. The system of claim 15, wherein said corrugations form a herringbone pattern, and are created by successively applying and then removing a braided wire casing around said foil.

17. The system of claim 1 wherein said radiator has a conical shape that is coaxially affixed to said single wire transmission line so that the apex of said conical shape points toward said launcher means.

18. The system of claim 17, further comprising a delaunching dielectric lens means mounted adjacent the apex of said conical shaped radiator.

19. The system of claim 17 wherein said radiator has wave polarizing means disposed on an outer conical surface thereof.

20. The system of claim 19 wherein said wave polarizing means comprises fluted structure spiralling circumferentially and axially on said radiator surface.

21. A method of radar jamming from an aircraft seeking to avoid being located by radar, comprising the steps of:
generating a noise signal suitable for being transmitted from the aircraft;
launching said noise signal onto the leading end of a single wire transmission line that is towed behind the aircraft such that the noise signal travels toward a trailing end of the line as a surface wave; and
radiating said noise signal from a location adjacent the trailing end of said single wire transmission line by means of a passive radiator attached to the line so that the noise signal radiates from an apparent source disposed behind the aircraft by a distance corresponding to the length of the towed single wire transmission line.

* * * * *